United States Patent
Schmaucks

(10) Patent No.: US 8,053,507 B2
(45) Date of Patent: Nov. 8, 2011

(54) HIGHLY FILLED ELASTOMERIC RESIN COMPOSITIONS WITH ADDED MICROSILICA FOR PROCESSABILITY

(75) Inventor: Gerd Schmaucks, Sogne (NO)

(73) Assignee: Elkem AS, Oslo (NO)

( * ) Notice: Subject to any disclaimer, the term of this patent is extended or adjusted under 35 U.S.C. 154(b) by 556 days.

(21) Appl. No.: 10/517,126

(22) PCT Filed: May 22, 2003

(86) PCT No.: PCT/NO03/00166
§ 371 (c)(1),
(2), (4) Date: Mar. 5, 2006

(87) PCT Pub. No.: WO03/104317
PCT Pub. Date: Dec. 18, 2003

(65) Prior Publication Data
US 2006/0148961 A1    Jul. 6, 2006

(30) Foreign Application Priority Data
Jun. 7, 2002 (NO) .................................. 20022708

(51) Int. Cl.
*C01B 33/113* (2006.01)
*C01B 33/18* (2006.01)
*C08K 3/36* (2006.01)
*C08K 3/00* (2006.01)

(52) U.S. Cl. ........ 524/493; 423/337; 423/325; 423/263; 524/492; 524/451; 524/570; 524/567; 260/40; 260/42.46; 260/42.47; 260/42.49; 260/42.52; 106/228

(58) Field of Classification Search ................... 524/492, 524/493, 451, 570, 567; 260/42.49, 40, 42.46, 260/42.47, 42.52; 423/325, 326, 337; 106/228
See application file for complete search history.

(56) References Cited

U.S. PATENT DOCUMENTS

| 4,301,060 A | * | 11/1981 | Underwood et al. ......... 524/493 |
| 4,722,952 A |   | 2/1988  | Hatt |
| 5,276,082 A | * | 1/1994  | Forry et al. ..................... 524/504 |
| 5,707,734 A | * | 1/1998  | Hawkins et al. ............... 428/372 |
| 6,458,882 B1 | * | 10/2002 | Pyle et al. ....................... 524/492 |
| 6,777,468 B2 | * | 8/2004  | Barboric et al. ............... 524/130 |
| 6,809,144 B1 | * | 10/2004 | Danielssen et al. ........... 524/493 |

FOREIGN PATENT DOCUMENTS

| GB | 1135464 A | * | 12/1968 |
| JP | 09012888 A | * | 1/1997 |
| WO | WO 0027911 | * | 5/2000 |
| WO | WO 0188055 A1 | * | 11/2001 |

OTHER PUBLICATIONS

Wypych, George (2000). Handbook of Fillers—A Definitive User's Guide and Databook (2nd Edition). ChemTec Publishing. Online version available at: www.knovel.com/knovel2/Toc.jsp?BookID=1011&VerticalID=0.*
Machine Translation of JP09012888A.*
Emmett, Robert A. (1944) Acrylonitrile-Butadiene Copolymers. Industrial & Engineering Chemistry 36 (8), 730-734.*

* cited by examiner

*Primary Examiner* — Milton I Cano
*Assistant Examiner* — Darcy D Laclair
(74) *Attorney, Agent, or Firm* — Lucas & Mercanti, LLP

(57) ABSTRACT

The present invention relates to elastomeric compounds having a high filler content additionally containing 1 to 400% by weight of resin of microsilica as a modifier to improve the processability. Thereafter, the invention relates to a method for production of elastomeric compounds having a high filler content, wherein microsilica is added to the elastomeric compounds in an amount of 1 to 400% by weight of resin as a modifier to improve processability.

5 Claims, No Drawings

HIGHLY FILLED ELASTOMERIC RESIN COMPOSITIONS WITH ADDED MICROSILICA FOR PROCESSABILITY

CROSS REFERENCE TO PRIOR APPLICATIONS

This is a U.S. National Phase application under 35 U.S.C. §371 of International Patent Application No. PCT/N003/00166, filed May, 22, 2003, and claims the benefit of Norwegian Patent Application No. 20022708, Filed Jun. 7, 2002, both of which are incorporated by reference herein.

TECHNICAL FIELD

The present invention relates to new and improved resin compositions and, more particularly, to elastomeric resins with high filler loads that have improved processability. The method for producing these new and improved elastomeric compositions is also disclosed. The invention further relates to elastomeric resins having improved flame retardant capability.

TECHNICAL BACKGROUND

It is well known to produce elastomeric compounds such as those used in seals, gaskets, tyres, cables and other articles made from rubber using ingredients like fillers, plastizisers, antioxidants, curatives and others. All these compound ingredients are used to receive certain properties of the final article or are necessary during the manufacturing. But some of these substances do influence each other leading to detrimental effects on physical properties or on processing behaviour. Functional fillers, for instance some carbon blacks and precipitated silicas, are used to improve hardness, tensile strength, tear resistance and other desired properties, but they also, especially at high filler loadings, increase compound viscosity leading to poor processability and scorch safety. This has to be balanced out by the incorporation of plastizisers and/or process aids. Plastizisers and process aids have, however, a negative influence on physical properties, including fire performance and they can "bloom out". So far no material is known that could overcome the processing difficulties of elastomeric resin compositions with high filler loading, and still maintaining the desired physical properties.

It is very difficult to give a precise definition of "high filler loading" as it depends very much on the polymer used and on the application of the final compound. However, generally if the filler content of a highly filled elastomeric compounds is increased, the viscosity will increase to a level where the processability of the compounds will be strongly reduced. The amount of fillers in highly filled resins can thus, depending on the polymer, vary from about 15 to about 500% by weight of resin.

It is known to use microsilica as semi-reinforcing filler in elastomers replacing for instance MT (medium thermal)—black or calcium silicate fillers. In these instances microsilica has always been used as a replacement to obtain a less costly elastomer having the same strength. Thus the total filler loading has never been increased when using microsilica as a semi-reinforcing filler.

DISCLOSURE OF INVENTION

It is an object of the present invention to provide a highly filled elastomeric compound with a low viscosity to give a good processability without reducing the filler content and without negatively influencing physical properties of the elastomeric compounds. In some instances the filler content can even be increased without increasing the viscosity and without negatively influencing the physical properties. It is further an object to provide elastomeric compounds having an improved flame-retardant capability.

According to one aspect the present invention relates to elastomeric compounds having a high filler content, the elastomeric compounds being characterised in that they additionally contain 1 to 400% by weight of resin of microsilica as a modifier to improve the processability.

According to a preferred embodiment the elastomeric compounds contain 5 to 300% by weight of resin of microsilica.

Most preferably the elastomeric compounds contain 10 to 150% by weight of the resin of microsilica.

According to another aspect the present invention relates to a method for production of highly filled elastomeric compounds having a high filler content, the method being characterised in that microsilica is added to the elastomeric compounds in an amount of 1 to 400% by weight of resin to improve the processability.

According to a preferred embodiment microsilica is added to the elastomeric compounds in an amount of 5 to 300% by weight of resin.

For best results microsilica is added to the elastomeric compounds in an amount of 10 to 150% by weight of resin.

The term microsilica used in the specification and claims of this application is particulate amorphous $SiO_2$ obtained from a process in which silica (quartz) is reduced to SiO-gas and the reduction product is oxidised in vapour phase to form amorphous silica. Microsilica may contain at least 70% by weight silica ($SiO_2$) and has a specific density of 2.1-2.3 $g/cm^3$ and a surface area of 15-40 $m^2/g$. The primary particles are substantially spherical and have an average size of about 0.15 μm. Microsilica is preferably obtained as a co-product in the production of silicon or silicon alloys in electric reduction furnaces. In these processes large quantities of microsilica are formed. The microsilica is recovered in conventional manner using baghouse filters or other collection apparatus.

The present invention also relates to the use of microsilica as a modifier to improve the processability of elastomeric compounds and to the use of microsilica to improve the limiting oxygen index of flame retardant elastomeric compounds filled with aluminum trihydrate and/or magnesium hydroxide.

It has surprisingly been found that elastomeric compounds according to the present invention have a low viscosity and good processing properties compared to elastomeric compounds having the same high filler content, but do not contain microsilica. It has further been found that the addition of microsilica to elastomeric compounds having a high filler content can be used in all types of crosslinking technologies and it is not decreasing the rate of crosslinking in sulphur cured compounds like other siliceous materials such as precipitated silica. For elastomeric compounds containing other silica type fillers and silane coupling agents, no increase in silane dosage for coupling purposes is necessary. Thus in addition to reaching filler loading levels not possible so far, the present invention also allows savings in other compound ingredients and in processing costs due to better flow characteristics of the elastomeric compounds. Furthermore the compression set in the highly filled elastomeric compounds is improved.

It has also surprisingly been found that in flame retardant elastomeric compounds filled with aluminium trihydrate and/or magnesium hydroxide, the addition of microsilica to such elastomeric compounds results in an increased limiting oxygen index (LOI) and a stable char is formed when the elastomeric compounds filled with aluminum trihydrate and/or magnesium hydroxide are burning.

The elastomeric compounds according to the invention includes compounds based on elastomers like natural rubber (NR), ethylene-propylene-diene rubber (EPM and EPDM), styrene-butadiene rubber (SBR), acrylonitrile-butadiene rubber (NBR), polychloroprene rubber (PCP), speciality polymers like acrylate rubber and ethylene vinyl acetate copolymer and others and blends thereof and also compounds based on blends of elastomers with thermoplastics, so-called thermoplastic elastomers, and to a method for the production of those polymer compositions.

The term elastomer includes not only traditional elastomeric materials like natural rubber or synthetic rubber-like polymers but also blends thereof and thermoplastic elastomers.

The manufacturing of the elastomeric compounds can be done using conventional processes and equipment like open mill, internal mixers of all types and continuous mixers like single or twin-screw extruders.

The processing of the elastomeric compounds containing the modifier can be done using conventional methods, including but not restricted to extrusion, compression moulding, injection moulding and others.

DETAILED DESCRIPTION OF THE INVENTION

Example 1

30 parts per 100 parts resin (phr) of microsilica was added to a formulation based on EPDM rubber containing 140 phr calcined clay together with antioxidants, plastiziser and a peroxide cure system. The mixing of the compound was carried out in an internal mixer and the samples for the tests were press-cured at 180° C. for 20 minutes. The results obtained are shown in Table 1. For comparison purposes the EPDM rubber without microsilica was tested in the same way as the compound according to the invention. The tests were performed according to the following specifications: Tensile test: S2 DIN 53504, tear resistance (trouser tear) BS 6469.

TABLE 1

| Measured property | Prior Art EPDM rubber with 140 phr calcined clay filler | Invention EPDM rubber with 140 phr calcined clay filler and 30 phr microsilica |
|---|---|---|
| Mooney viscosity @ 130° C. | 45 | 47 |
| Tensile strength, MPa | 7.8 | 8.4 |
| Elongation at break, % | 283 | 276 |
| Tear resistance, N/mm | 2.0 | 2.8 |
| Compression set (10 min @ 200° C.) in % | 16.6 | 16.8 |

The results in Table 1 demonstrate that the EPDM rubber according to the invention has improved physical properties, especially a remarkable low compression set at this high filler level, together with the good processability, expressed by the viscosity value, compared to the EPDM rubber without microsilica.

Example 2

A compound based on chloroprene rubber was prepared with 50 phr-precipitated silica having a surface area of 125 $m^2/g$. To the same compound, 20 phr of the precipitated silica was replaced with 30 phr of microsilica. The mixing of the compounds was carried out as described in Example 1. The specimens for physical tests were press-cured at 180° C. for 15 minutes. As can be seen from the results in Table 2 it was surprisingly found that the replacement of precipitated silica with microsilica decreases the compound viscosity leading to better processability while maintaining a high level of physical properties.

TABLE 2

| Measured Property | Prior Art Chloroprene rubber with 50 phr precipitated silica | Invention Chloroprene rubber with 30 phr precipitated silica + 30 phr microsilica |
|---|---|---|
| Mooney viscosity @ 120° C. | 41.0 | 25.7 |
| Tensile strength, MPa | 17.6 | 18.1 |
| Elongation at break, % | 742 | 754 |
| Tear resistance, N/mm | 12.2 | 9.3 |

Example 3

A compound based on solution SBR and filled with 80 phr highly dispersible precipitated silica having a surface area of 175 $m^2/g$ was modified by adding 20 phr microsilica. For comparison purposes a mix containing 100 phr of the precipitated silica was also prepared. A three step mixing procedure was used for compounding. The curing of the specimens for physical tests was carried out at 160° C. for 20 minutes.

The results are shown in Table 3. The abrasion was measured according to DIN 53516.

TABLE 3

| Measured property | Prior Art SBR containing 80 phr precipitated silica | Prior SBR containing 100 phr precipitated silica | Invention SBR containing 80 phr precipitated silica + 20 phr microsilica |
|---|---|---|---|
| Mooney viscosity @ 100° C. | 82 | 117 | 87 |
| Tensile strength, MPa | 21.5 | 20.0 | 19.5 |
| Elongation at break, % | 447 | 402 | 383 |
| Tear resistance, N/mm | 17.1 | 17.9 | 22.1 |
| Shore A Hardness | 69 | 79 | 72 |
| Abrasion, $mm^3$ | 145 | 175 | 157 |

Comparing these results the amazing effect of microsilica on compound properties at high filler loading is obvious. Not only that higher filler loading is possible without processing problems, but there is also an improvement in physical properties not achievable with conventional precipitated silica.

Example 4

In a NBR/PVC compound filled with a mix of carbon black N550, calcium carbonate and precipitated silica the total filler content was 110 phr. This compound was modified by addition of 20 phr microsilica. The mixing was carried out as described in example 1. The test specimens were press-cured at 180° C. for 15 minutes. The results are shown in Table 4

TABLE 4

| Measured property | Prior Art NBR/PVC with 28 phr precipitated silica | Invention NBR/PVC with 20 phr precipitated silica + 20 phr microsilica |
|---|---|---|
| Mooney viscosity @ 120° C. | 58 | 42 |
| Tensile strength, MPa | 12.1 | 13.4 |
| Elongation at break, % | 350 | 377 |
| Tear resistance, N/mm | 5.8 | 4.7 |
| Oil resistance 24 h @ 100° C. in ASTM-oil No. 2 | | |
| Tensile strength, MPa | 13.1 | 13.9 |
| Elongation at break, % | 307 | 321 |

The results in Table 4 show that the NBR/PVC compound according to the invention has a lower viscosity than the prior art compound although it contains 12 phr more of filler. The results for oil resistance further show that the NBR/PVC compound containing microsilica maintains its tensile strength and elongation when the compound is subjected to oil at high temperature.

Example 5

To a compound based on natural rubber (SIR 20) and filled with 50 phr carbon black (N234), 50 phr of microsilica was added. For comparison purposes also compounds containing 100 phr N234 (Comparison 1) and 50 phr N234+50 phr precipitated silica (Comparison 2), respectively, were prepared. The mixing was carried out in an internal mixer using a two-step cycle similar to example 1. The silica and silane containing compounds were mixed using a standard three-step procedure as in example 3. The test specimens were press-cured for 15 minutes at 150° C. The results are summarised in Table 5.

TABLE 5

| Measured property | Prior Art SIR 20 with 50 phr carbon black N234 | Comp. 1 SIR 20 with 100 phr carbon black N234 | Comp. 2 SIR 20 with 50 phr carbon black N234 + 50 phr precipitated silica | Invention SIR 20 with 50 phr carbon black N234 + 50 phr microsilica |
|---|---|---|---|---|
| Mooney viscosity @ 100° C. | 58.7 | Not measurable, >220 | 106.5 | 55.4 |
| Tensile strength, MPa | 29.0 | 18.2 | 13.8 | 21.8 |
| Elongation at break, % | 576 | 221 | 344 | 441 |
| Hardness, Shore A | 63 | 88 | 71 | 73 |
| Tear resistance, N/mm | 18.6 | 15.7 | 4.1 | 23.9 |

From the results in Table 5 it is obvious that the addition of microsilica allows the preparation of compounds not possible with conventional materials.

One has to keep in mind that no optimisation of compound formulation was carried out in the examples listed above. This means that further improvement of the properties is possible when additional re-formulation of the recipes are done.

The above examples 1-5 clearly show that the addition of microsilica to highly filled elastomeric compounds improves the physical properties of the materials while maintaining and even lowering the viscosity of the compounds.

Example 6

This examples illustrates the effect on microsilica addition on fire performance of elastomeric resin compositions.

To a halogen-free, flame retardant compound based on ethylene vinyl acetate (100 phr) and filled with 160 phr aluminium trihydrate, 30 phr of microsilica were added. The mechanical properties of the compund were not effected. The limiting oxygen index, measured according to ASTM D2863 was increased from 38 to 43%. The stability of the protective char, formed during the burning of the polymer matrix, was significantly improved and withstand three to four times longer than without microsilica addition.

The invention claimed is:

1. A method for production of a highly filled elastomeric compound comprising:
    forming a highly filled elastomeric compound from an elastomeric resin wherein a filler comprises about 110% to about 500% by weight of the elastomeric resin; and
    adding dry microsilica to the highly filled elastomeric compound in an amount of 255% to 400% by weight of elastomeric resin as a modifier to improve processability, wherein the microsilica is particulate amorphous $SiO_2$ obtained from a process in which silica is reduced to SiO-gas and oxidized in vapor phase to form amorphous silica which contains at least 70% by weight silica ($SiO_2$) and has a specific density of 2.1-2.3 $g/cm^3$ and a surface area of 15-40 $m^2/g$, and has primary particles being substantially spherical with an average size of about 0.15 µm;
    wherein the elastomeric resin comprises a polymer selected from the group consisting of natural rubber (NR), ethylene-propylene-diene rubber (EPM and EPDM), styrene-butadiene rubber (SBR), acrylonitrile-butadiene rubber (NBR), polychloroprene rubber (PCP), acrylate rubber, NBR blended with polyvinyl chloride, ethylene vinyl acetate copolymer and blends thereof.

2. The method according to claim 1, wherein microsilica is added to the highly filled elastomeric compound in an amount of 20% to 300% by weight of elastomeric resin.

3. The method for production of a highly filled elastomeric compound of claim 1 wherein the elastomeric resin consists of a polymer selected from the group consisting of natural rubber (NR), ethylene-propylene-diene rubber (EPM and EPDM), styrene-butadiene rubber (SBR), acrylonitrile-butadiene rubber (NBR), polychloroprene rubber (PCP), acrylate rubber, ethylene vinyl acetate copolymer and blends thereof.

4. A method of using dry microsilica as a modifier to improve processability of a highly filled elastomeric compound having a filler content of about 110% to about 500% by weight of elastomeric resin, comprising a step of adding 255% to 400% by weight of elastomeric resin of microsilica to said compound, wherein the microsilica is particulate amorphous $SiO_2$ obtained from a process in which silica is reduced to SiO-gas and oxidized in vapor phase to form amorphous silica, which contains at least 70% by weight silica ($SiO_2$) and has a specific density of 2.1-2.3 $g/cm^3$ and a surface area of 15-40 $m^2/g$, and has primary particles being substantially spherical with an average size of about 0.15 µm;
    wherein the elastomeric resin comprises a polymer selected from the group consisting of natural rubber (NR), ethylene-propylene-diene rubber (EPM and EPDM), styrene-butadiene rubber (SBR), acrylonitrile-butadiene rubber (NBR), polychloroprene rubber (PCP), acrylate rubber, NBR blended with polyvinyl chloride, ethylene vinyl acetate copolymer and blends thereof.

5. The method of using microsilica as a modifier to improve processability of a highly filled elastomeric compound of claim 4, wherein the elastomeric resin consists of a polymer selected from the group consisting of natural rubber (NR), ethylene-propylene-diene rubber (EPM and EPDM), styrene-butadiene rubber (SBR), acrylonitrile-butadiene rubber (NBR), polychloroprene rubber (PCP), acrylate rubber, ethylene vinyl acetate copolymer and blends thereof.

* * * * *